United States Patent
Kim et al.

(10) Patent No.: US 8,144,770 B2
(45) Date of Patent: Mar. 27, 2012

(54) APPARATUS AND METHOD FOR ENCODING MOVING PICTURE

(75) Inventors: Byung Gyu Kim, Busan (KR); Seon Tae Kim, Daejeon (KR); Chang Sik Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1231 days.

(21) Appl. No.: 11/853,936

(22) Filed: Sep. 12, 2007

(65) Prior Publication Data

US 2008/0069211 A1 Mar. 20, 2008

(30) Foreign Application Priority Data

Sep. 14, 2006 (KR) .................. 10-2006-0088858

(51) Int. Cl.
*H04N 7/12* (2006.01)
(52) U.S. Cl. ............................. 375/240.12; 375/240.13
(58) Field of Classification Search .................. None
See application file for complete search history.

(56) References Cited

U.S. PATENT DOCUMENTS

| | | | |
|---|---|---|---|
| 6,037,987 A * | 3/2000 | Sethuraman ............ | 375/240.03 |
| 6,944,224 B2 | 9/2005 | Zhao et al. | |
| 2005/0135484 A1* | 6/2005 | Lee et al. ................ | 375/240.16 |
| 2005/0190977 A1* | 9/2005 | Jeon et al. ..................... | 382/239 |
| 2006/0002474 A1 | 1/2006 | Au et al. | |
| 2006/0088099 A1 | 4/2006 | Gao et al. | |
| 2007/0121723 A1* | 5/2007 | Mathew et al. .......... | 375/240.12 |
| 2007/0140339 A1* | 6/2007 | Bhaskaran et al. ....... | 375/240.12 |
| 2007/0237240 A1* | 10/2007 | Lee et al. ................ | 375/240.24 |

FOREIGN PATENT DOCUMENTS

| | | |
|---|---|---|
| JP | 2005-295526 | 10/2005 |
| KR | 19960028458 | 7/1996 |
| KR | 1020050026318 | 3/2005 |
| KR | 1020050061762 | 6/2005 |
| KR | 1020050089090 | 9/2005 |
| KR | 1020050061762 | 6/2006 |
| WO | WO2005/004491 | 1/2005 |

OTHER PUBLICATIONS

Jeyun Lee, et al; "Fast mode decision for H.264;" 2004 IEEE International Conference on Multimedia and Expo (ICME).
Feng Pan, et al: "Fast Mode Decision Algorithm for Intraprediction in H.264/AVC Video Coding;" IEEE Transactions on Circuits and Systems for Video Technology, vol. 15, No. 7, Jul. 2005.
Chao-Chung Cheng, et al; "Fast Three Step Intra Prediction Algorithm for 4X4 blocks in H.264;" 2005 IEEE.
Dong-Gyu Sim,et al; "Contex-adaptive mode selection for intra-block coding in H.264/MPEG-4 Part 10;" Real-Time Imaging 11 (2006) 1-6.

* cited by examiner

*Primary Examiner* — Phirin Sam
(74) *Attorney, Agent, or Firm* — Ladas & Parry LLP

(57) ABSTRACT

Provided are moving picture encoding apparatus and method skipping intra prediction in encoding mode determination using rate-distortion (RD) costs and determining an encoding mode at high speed. The moving picture encoding method includes the steps of: setting the lowest one of rate-distortion costs of macroblocks adjacent to a macroblock to be encoded as a threshold value; setting the lowest one of mode-specific distortion costs obtained by inter prediction for the macroblock to be encoded as an optimum inter mode distortion cost; comparing the threshold value with the optimum inter mode distortion cost; and when the threshold value is larger than the optimum inter mode distortion cost, as a result of the comparison, skipping intra prediction and setting a mode having the optimum inter mode distortion cost as a final encoding mode.

16 Claims, 4 Drawing Sheets

4x4 Intra luminance prediction mode

16x16 Intra luminance prediction mode

8x8 Intra chrominance prediction mode

FIG. 5

| (k−1, l−1) | (k−1, l) | (k−1, l+1) |
|---|---|---|
| (k, l−1) | $MB_{kl}$ | |

APPARATUS AND METHOD FOR ENCODING MOVING PICTURE

CROSS-REFERENCE TO RELATED APPLICATION

This application claims priority to and the benefit of Korean Patent Application No. 2006-88858, filed on Sep. 14, 2006, the disclosure of which is incorporated herein by reference in its entirety.

BACKGROUND

1. Field of the Invention

The present invention relates to encoding moving picture data, and more particularly, to a moving picture encoding apparatus and method skipping intra prediction in encoding mode determination using rate-distortion costs and determining an encoding mode at high speed.

2. Discussion of Related Art

H.264 is a new video coding standard and referred to as "Moving Picture Experts Group (MPEG)-4 Advanced Video Coding (AVC)." Similar to conventional video coding standards, the H.264 standard sets a block having 16×16 pixels to a single macroblock but employs variable block-based motion estimation capable of dividing the macroblock into variable-sized blocks. In addition, the standard enables quarter pixel-based motion compensation, and more accurate motion estimation and compensation using multiple reference frames. Furthermore, there is a function of intra prediction in a pixel domain that is lacking in the conventional video coding standards, so that similarity can be predicted using adjacent blocks in the same frame, thus increasing the compression rate.

A method for encoding a moving picture according to the H.264 standard involves performing inter prediction or intra prediction. Each prediction has a variety of encoding modes and requires performing an operation according to each encoding mode and then selecting the encoding mode having the smallest rate-distortion cost. Thus, the amount of calculations actually performed by a video compression system is enormous.

SUMMARY OF THE INVENTION

The present invention is directed to a method for encoding a moving picture, checking a condition under which intra prediction can be skipped using rate-distortion (RD) costs of macroblocks neighboring a macroblock to be currently encoded, and thereby reducing the amount of calculations of a video compression system and increasing the compression speed.

One aspect of the present invention provides a method for encoding a moving picture, comprising the steps of: setting the lowest one of RD costs of macroblocks adjacent to a macroblock to be encoded as a threshold value; setting the lowest one of mode-specific distortion costs obtained by inter prediction for the macroblock to be encoded as an optimum inter mode distortion cost; comparing the threshold value with the optimum inter mode distortion cost; and when the threshold value is larger than the optimum inter mode distortion cost, as a result of the comparison, skipping intra prediction and setting a mode having the optimum inter mode distortion cost as a final encoding mode.

Another aspect of the present invention provides a method for encoding a moving picture, comprising the steps of: setting the lowest one of RD costs of macroblocks adjacent to a macroblock to be encoded as a threshold value; setting the lowest one of mode-specific distortion costs obtained by inter prediction for the macroblock to be encoded as an optimum inter mode distortion cost; when the threshold value is larger than the optimum inter mode distortion cost, skipping intra prediction and setting a mode having the optimum inter mode distortion cost as a final encoding mode; when the threshold value is less than the optimum inter mode distortion cost, setting the lowest one of mode-specific RD costs obtained by intra prediction to the optimum intra mode RD cost; and comparing the optimum inter mode RD cost, which is the sum of the optimum inter mode distortion cost and a bit rate, with the optimum intra mode RD cost, and setting the mode having the smaller of the two RD costs as a final encoding mode.

Still another aspect of the present invention provides an apparatus for encoding a moving picture, comprising: an encoding unit for encoding a macroblock of a specific picture using encoding modes used in inter prediction and intra prediction; a transform/quantization unit for removing the redundancy of image data and quantizing the image data; a variable length coding unit for changing a code word length according to a generation frequency of a specific symbol and thereby compressing data; an inverse transform/quantization unit for performing the inverse function of the transform/quantization unit; an RD cost calculation unit for calculating an RD cost on the basis of a rate value transferred from the variable length coding unit and a distortion value transferred from the inverse transform/quantization unit; and a mode selection unit for storing the calculation result of the RD cost calculation unit mode by mode, determining a mode having the lowest RD cost, and transferring the determination result to the encoding unit. Here, when the lowest one of mode-specific distortion costs obtained by inter prediction for the macroblock to be encoded is less than a specific threshold value, the mode selection unit skips intra prediction and sets an inter mode having the lowest distortion cost as a final encoding mode.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which:

FIG. 5 illustrates a macroblock to be currently restored together with adjacent macroblocks neighboring the macroblock.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling of practice of the present invention by those of ordinary skill in the art.

Figure 1:
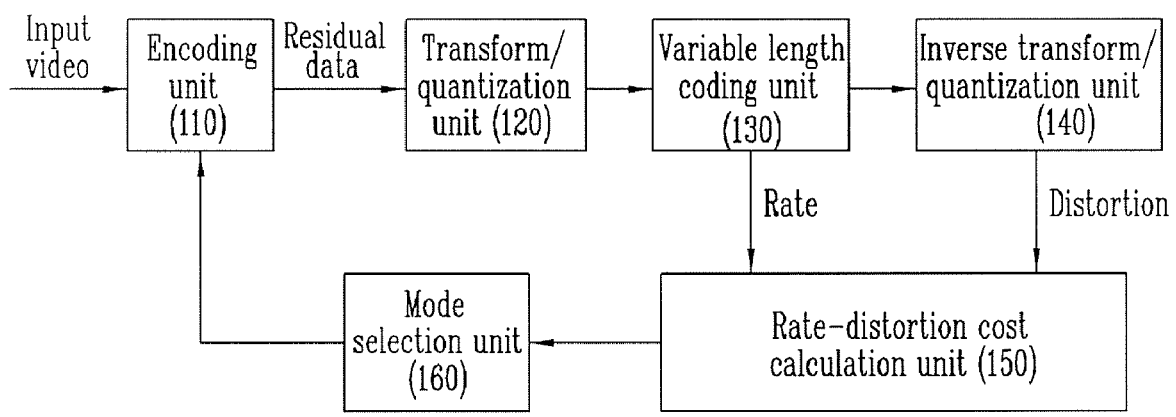
FIG. 1 is a block diagram of an apparatus for encoding a moving picture according to an exemplary embodiment of the present invention.

FIG. 1 is a block diagram of a moving picture encoding apparatus compressing a moving picture by a rate-distortion (RD) optimization process according to an exemplary embodiment of the present invention.

Referring to FIG. 1, the encoding apparatus comprises an encoding unit 110, a transform/quantization unit 120, a variable length coding unit 130, an inverse transform/quantization unit 140, an RD cost calculation unit 150, and a mode selection unit 160.

The encoding unit 110 first divides one picture into macroblocks and encodes each macroblock using all encoding modes for inter prediction and all encoding modes for intra prediction. The encoding modes for the inter prediction and intra prediction will be described with reference to FIGS. 2 and 3.

Figure 2:
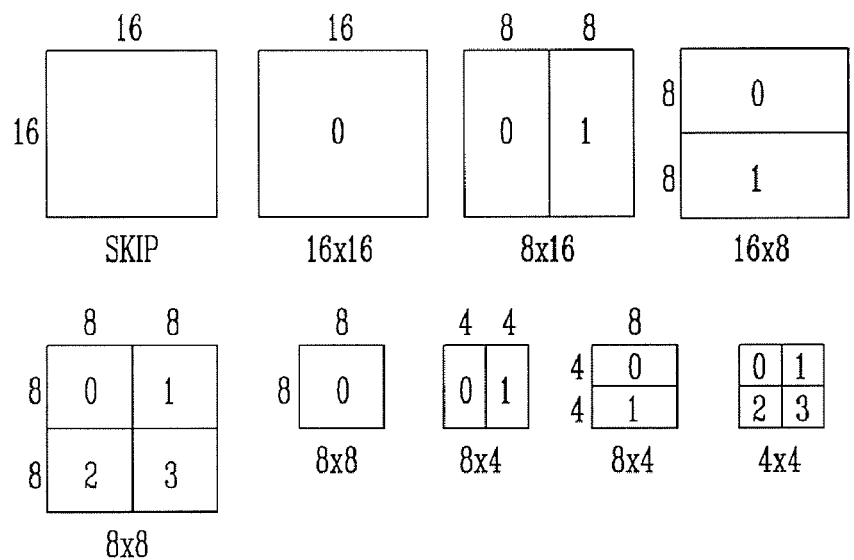
FIG. 2 illustrates macroblock types used in inter prediction.

FIG. 2 illustrates macroblock types used in the inter prediction.

One 16×16 macroblock can be divided into 16×8, 8×16 and 8×8 blocks, and the 8×8 block can be divided further into 8×4, 4×8 and 4×4 blocks. Motion estimation and motion compensation is performed for each sub-block divided in this way, and thereby a motion vector is determined. Here, the inter prediction is a method encoding a difference between a pixel value and motion vector information indicating positions of one or a plurality of blocks selected in a reference picture and thereby removing a temporal redundancy factor. According to H.264, a 16×16 macroblock is divided into 16×8, 8×16 and 8×8 blocks, and the 8×8 block can be divided further into smaller 8×4, 4×8 and 4×4 blocks. All the blocks are encoded according to each bock type, and one optimum mode is determined. Here, the optimum mode is determined by the mode selection unit 160 on the basis of an RD cost calculated by the RD calculation unit 150.

Meanwhile, the intra prediction, unlike the inter prediction, is a method calculating an estimation value for a macroblock to be encoded using values of pixels adjacent to the macroblock, and thereby encoding a difference between the estimation value and the pixel values without referring to a reference picture. The intra prediction method removes a spatial redundancy factor.

Figure 3:
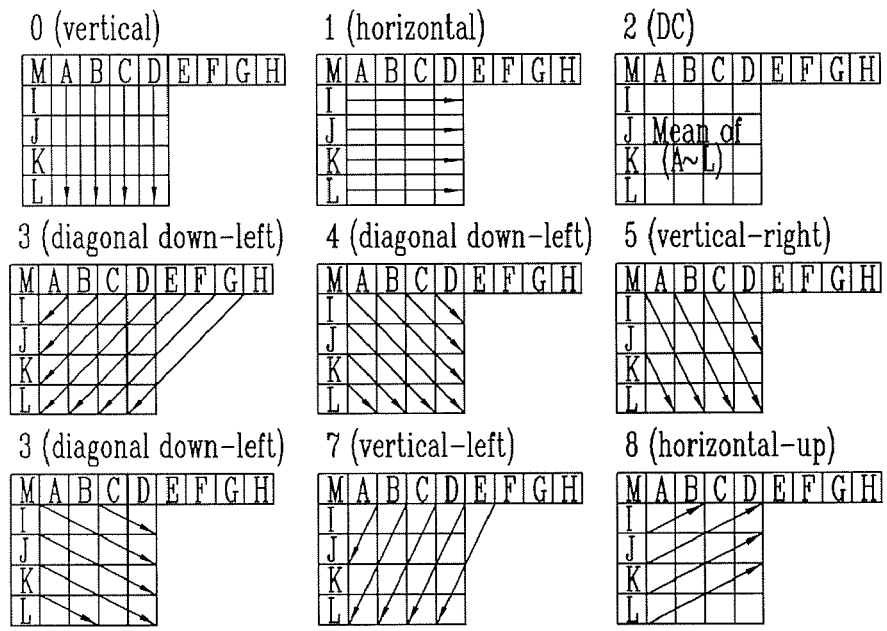
FIG. 3 illustrates a block to be predicted in intra prediction together with adjacent blocks.
Figure 3:
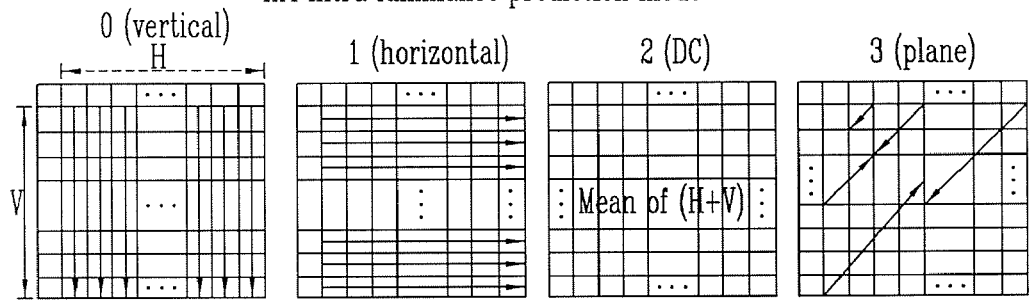
Figure 3:
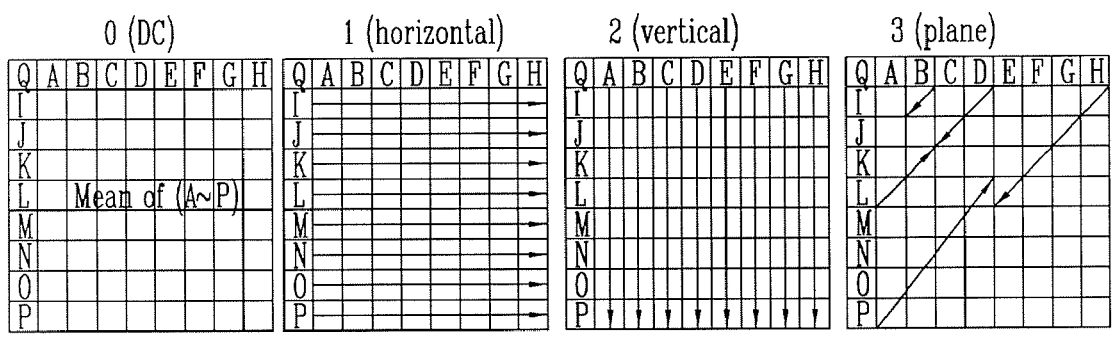

FIG. 3 illustrates a block to be predicted in the intra prediction together with adjacent blocks.

Referring to FIG. 3, according to a block to be predicted, luminance (luma) prediction includes 4×4 prediction and 16×16 prediction, and chrominance (chroma) prediction includes 8×8 prediction. A deeply-shaded block denotes a block to be predicted, and non-shaded blocks surrounding the block to be predicted denote adjacent blocks.

The 4×4 intra luma prediction mode includes a total of nine modes which are a vertical mode 0, a horizontal mode 1, a down conversion (DC) mode 2, a diagonal down-left mode 3, a diagonal down-right mode 4, a vertical-right mode 5, a horizontal-down mode 6, a vertical-left mode 7, and a horizontal-up mode 8. The 16×16 intra luma prediction mode includes a total of four modes which are a vertical mode 0, a horizontal mode 1, a DC mode 2, and a plane mode 3. The 8×8 intra chroma prediction mode includes a total of four modes which are a DC mode 0, a horizontal mode 1, a vertical mode 2, and a plane mode 3. Since RD costs should be calculated in various modes as mentioned above, intra prediction as well as inter prediction requires a huge amount of calculations. The intra prediction, like the inter prediction, has a variety of modes and selects the optimum mode by RD cost calculation.

The encoding unit 110 encodes each macroblock mode by mode by inter prediction or intra prediction and transfers a residual resulting from subtraction of the prediction value from the current macroblock to the transform/quantization unit 120.

Referring back to FIG. 1, the transform/quantization unit 120 transforms an image from the spatial domain to another domain using various mathematical transform methods so as to remove redundancy from image data, and analyzes the transformed image, thereby compressing the image. For the compression method, differential pulse code modulation (DPCM), discrete cosine transform (DCT), etc. is used. After the transformation process, a quantization process is performed that substitutes X having a value in a certain range with a quantized signal Y having a value in a smaller range to express X using fewer bits. The quantization process includes scalar quantization, which substitutes one input sample with one quantized output value, vector quantization, which substitutes one group of input samples with a group of quantized values, and so on. The transform/quantization unit 120 transforms/quantizes the residual data transferred from the encoding unit 110 and transfers it to the variable length coding unit 130.

The variable length coding unit 130 is a component performing a process converting input symbols into a specific code word. The variable length coding unit 130 converts frequently generated symbols into a short code word and non-frequently-generated symbols into a long code word, thereby compressing data. The Huffman coding method is frequently used for the process. The variable length coding unit 130 compresses the data transferred from the transform/quantization unit 120 into bit-form data and transfers the bit rates, i.e., rate values, to the RD cost calculation unit 150. Here, the bit rates are based on the number of bits of the residual signal passed through the variable length coding unit 130 after the inter prediction or intra prediction is performed. In addition, the variable length coding unit 130 transfers code word-form data, which is an output, to the inverse transform/quantization unit 140.

The inverse transform/quantization unit 140 receives the output data of the variable length coding unit 130 and performs the inverse function of the transform/quantization unit 120. After the inverse transform and inverse quantization processes, macroblocks are restored. The inverse transform/quantization unit 140 calculates a difference between the original macroblock and the restored macroblocks and transfers data on degrees of distortion to the RD cost calculation unit 150.

The RD cost calculation unit 150 calculates RD costs on the basis of the rate values transferred from the variable length coding unit 130 and the distortion values transferred from the inverse transform/quantization unit 140 according to the following formula:

$$J_{RD} = SAD_{mode} + \lambda \times \{R(\text{Header}) + R(\text{Residual})\}. \quad \text{Formula 1}$$

$J_{RD}$ is a cost function denoting an RD value, and $SAD_{mode}$ is the sum of absolute difference (SAD) denoting a difference value between a current macroblock and a restored macroblock in the given mode.

The $SAD_{mode}$ is calculated by the following formula:

$$SAD_{mode} = \sum_{k=0}^{15} \sum_{l=0}^{15} (B(k,l) - B'(k,l))^2. \quad \text{Formula 2}$$

Here, B(k, l) and B'(k, l) denote (k, l)th pixel values of the current macroblock and restored macroblock, respectively.

λ is a Lagrangian constant, which is calculated by the following $$\lambda = 0.85 \times 2^{(QP-12)/3}.$$ Formula 3

Here, QP is an integer from 0 to 51 denoting a quantization value. This is a constant multiplied with the bit rate to make the dimension of the bit rate equal the RD cost.

R(x) denotes a number of bits used to encode a variable x. More specifically, it denotes a number of bits used to encode header information in case of x=Header and it denotes a number of bits used to encode residual data in case of x=Residual.

The mode selection unit 160 stores a calculation result of the RD cost calculation unit 150 mode by mode, determines which mode has the lowest RD cost, and transfers the determination result to the encoding unit 110. In addition, when the lowest distortion cost obtained by inter prediction for the macroblock to be encoded is less than a specific threshold value, the mode selection unit 160 skips intra prediction and sets an inter mode having the lowest distortion cost as a final encoding mode. A method for setting up the specific threshold value and a step of setting up the inter mode having the lowest distortion cost will be described in further detail below.

Figure 4:
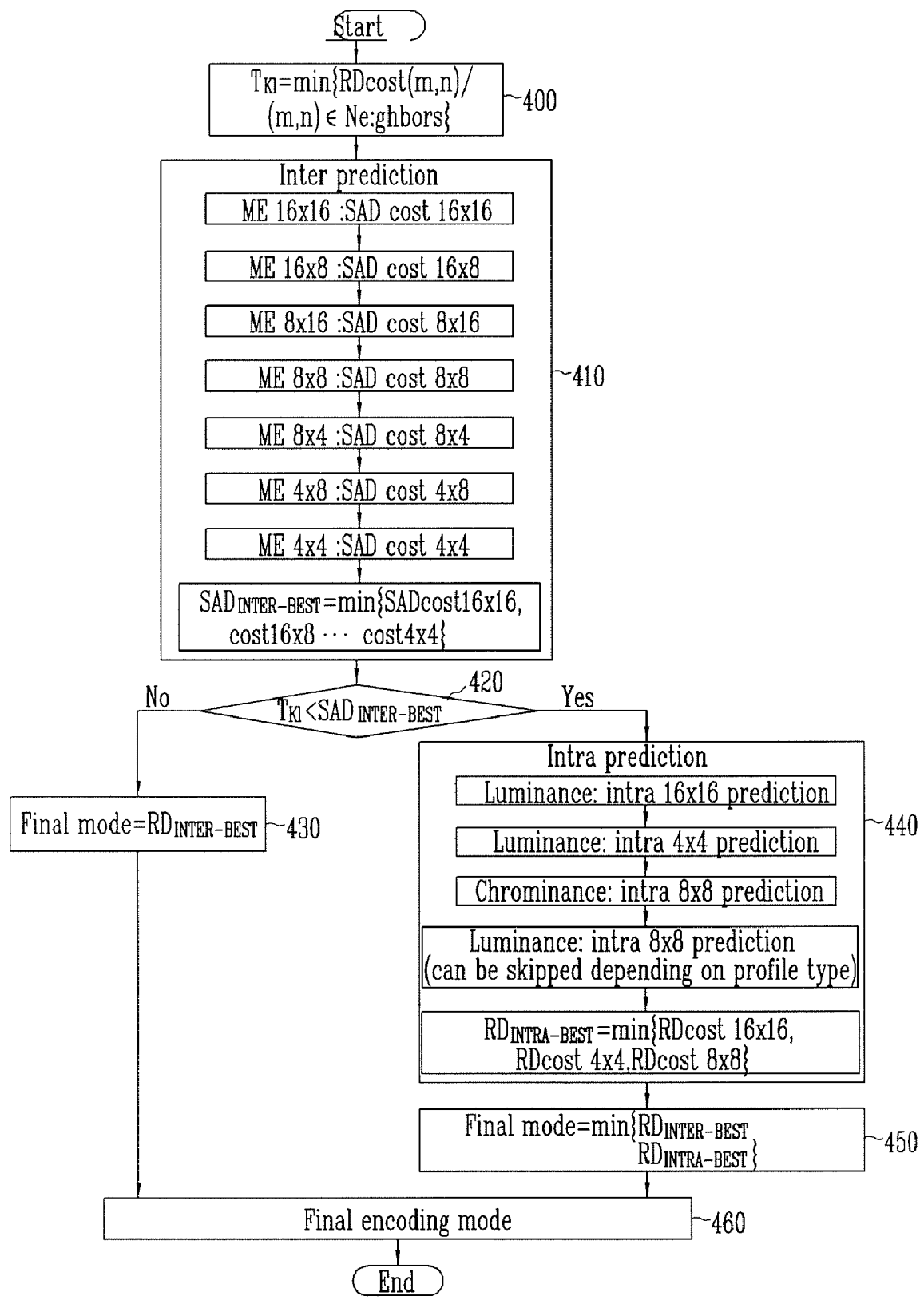
FIG. 4 is a flowchart showing a method for encoding a moving picture according to an exemplary embodiment of the present invention.

FIG. 4 is a flowchart showing a method for encoding a moving picture according to an exemplary embodiment of the present invention.

Referring to FIG. 4, the method comprises: step 400 of determining an adaptive threshold value; step 410 of calculating the optimum inter mode distortion cost; step 420 of comparing the determined threshold value with the inter mode distortion cost; step 430 of skipping intra prediction when the inter mode distortion cost does not exceed the threshold value, as a result of the comparison; step 440 of performing intra prediction to calculate the optimum intra mode cost when the inter mode distortion cost exceeds the threshold value, as a result of the comparison; step 450 of comparing the optimum inter mode RD cost with the optimum intra mode RD cost to determine a final encoding mode after step 440; and step 460 of determining a final encoding mode according to the results of steps 430 and 450.

First, in step 400 of determining an adaptive threshold value, the lowest RD cost is detected among RD costs of adjacent macroblocks neighboring a macroblock to be currently restored, which is described below with reference to the drawings.

Figure 5:
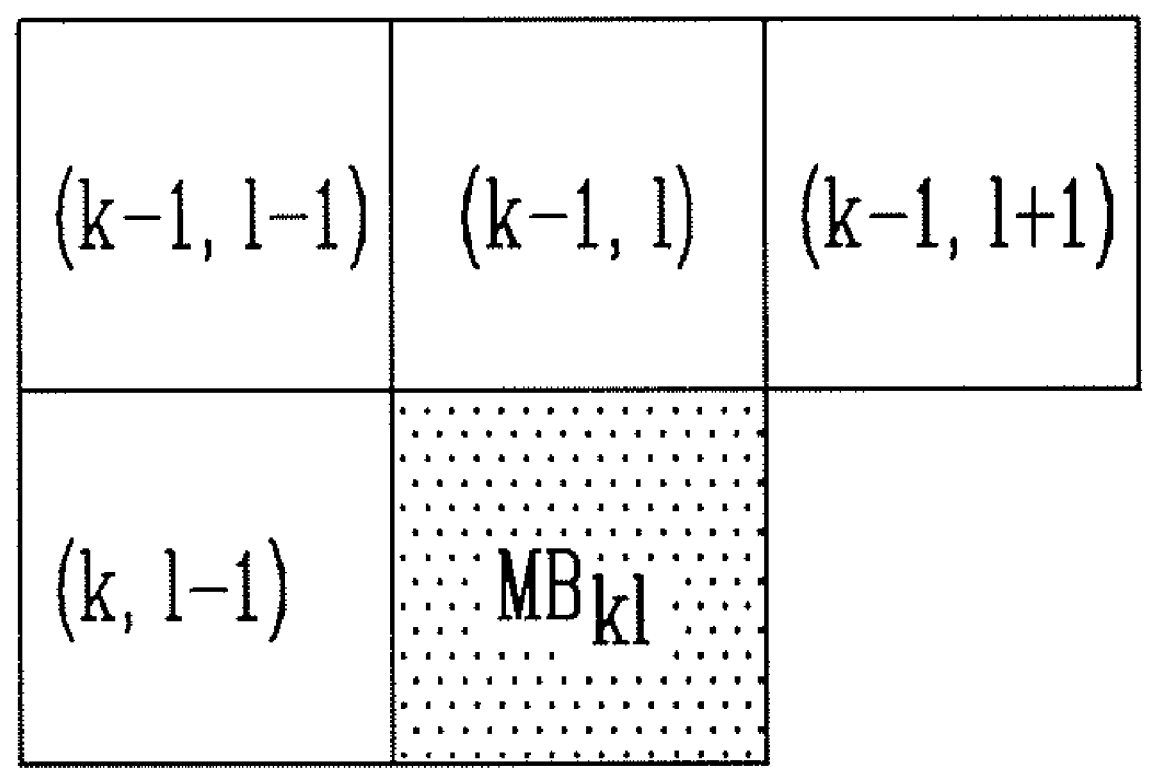

FIG. 5 illustrates a macroblock to be currently restored together with adjacent macroblocks neighboring the macroblock.

Referring to FIG. 5, shaded $MB_{kl}$ is a macroblock to be currently restored wherein k denotes a vertical coordinate and l denotes a horizontal coordinate. According to the H.264 standard, since a macroblock at the upper left position is encoded first, macroblocks having the coordinates of (k−1, l−1), (k−1,l), (k−1,l+1) and (k,l−1) are encoded before $MB_{kl}$.

Therefore, RD costs of the respective macroblocks having the coordinates of (k−1, l−1), (k−1, l), (k−1, l+1) and (k, l−1) have been already calculated and are stored in a temporary memory. A lowest RD cost $T_{kl}$ is determined on the basis of the stored values by the following formula:

$$T_{kl} = \min\{RDcost((m,n))|(m,n) \in \text{Neighbors}\}.$$ Formula 4

A specific number of adjacent macroblocks among the already encoded adjacent macroblocks neighboring the macroblock to be encoded are selected, and the lowest of RD costs of the selected macroblocks is detected.

The selected macroblocks may include macroblocks adjacent to the left side, upper side, left vertex and right vertex of the macroblock to be encoded. A threshold value determined by the process is set to a value of $T_{kl}$.

Referring back to FIG. 4, in step 410 of calculating the optimum inter mode distortion cost, inter prediction is performed for the macroblock to be currently restored mode by mode, and thereby the optimum inter mode is detected. More specifically, using motion estimation (ME) for seven variable block modes (16×16, 16×8, 8×16, 8×8, 8×4, 4×8 and 4×4) shown in FIG. 2, the optimum inter mode is obtained by RD cost calculation.

The optimum inter mode distortion cost may be obtained on the basis of the above-mentioned SAD cost only.

$$SAD_{INTER\_BEST} = \min\{SAD\ cost16\times16, cost16\times8,\ cost8\times16,\ldots, cost4\times4\}$$ Formula 5

Referring to FIG. 5, a mode having the lowest one of SAD costs calculated for the macroblock to be currently restored mode by mode is selected. Here, the SAD costs are calculated by Formula 2. The optimum cost determined by Formula 5 is denoted $SAD_{INTER\_BEST}$.

Next, in step 420 of comparing the determined threshold value with the optimum inter mode distortion cost, it is determined whether intra prediction will be performed or not.

The determined value $T_{kl}$ is compared with the value $SAD_{INTER\_BEST}$. The intra prediction step is skipped when $T_{kl}$ is larger than $SAD_{INTER\_BEST}$ and performed when $T_{kl}$ is smaller than $SAD_{INTER\_BEST}$. This assumes that when the optimum $SAD_{INTER\_BEST}$ obtained by the inter mode detection is smaller than any previously-calculated RD cost, a current inter mode is very likely to be finally determined as the optimum mode.

In step 430, when the value $T_{kl}$ is larger than the value $SAD_{INTER\_BEST}$, as a result of the determination, an inter mode having the value $SAD_{INTER\_BEST}$ is determined as the optimum encoding mode without intra prediction. Since the SAD value is not a final RD cost, an RD cost obtained by adding a bit rate to the SAD value according to Formula 1 is transferred.

In step 440, when the value $T_{kl}$ is smaller than the value $SAD_{INTER\_BEST}$, as a result of the determination, the optimum intra mode is detected with intra prediction.

As described above, in intra prediction, luma prediction includes 4×4 prediction and 16×16 prediction, and chroma prediction includes 8×8 prediction. Meanwhile, since High Profile among Baseline Profile, Main Profile, High Profile included in the H.264 standard supports 8×8 mode in luma prediction, a step of determining a profile type is included to add cost calculation for 8×8 intra luma prediction mode. Therefore, a step of cost calculation for 8×8 intra luma prediction mode shown in FIG. 4 may be skipped according to a profile type.

$$RD_{INTRA\_BEST} = \min\{RDcost16\times16, RDcost4\times4,\ RDcost8\times8\}$$ Formula 6

According to the description, an intra mode having the lowest cost according to Formula 6 is detected. As described above, a cost calculation formula for 8×8 intra luma prediction mode may be also omitted in Formula 6.

Next, in step 450, the optimum inter mode RD cost is compared with the optimum intra mode RD cost, and thereby a final encoding mode is determined.

First, since the optimum inter mode distortion cost is not an RD cost but a SAD value, an RD cost is calculated by adding a bit rate to the SAD value according to Formula 1. Subsequently, the optimum inter mode RD cost determined in step 410 is compared with the optimum intra mode RD cost determined in step 440, and thereby a mode having the lowest cost is determined as a final encoding mode.

In step 460, the mode determined in step 430 or 450 becomes the final encoding mode.

The result value of step 430 that is calculated without the intra prediction steps, or the result value that is calculated with the intra prediction steps 440 and 450, is selected according to the determination result of step 420.

Using RD costs of macroblocks neighboring a macroblock to be currently encoded, a condition under which intra prediction can be skipped is detected and the macroblock is encoded, so that the calculation load of a video compression system can be reduced and the compression speed can be increased. When the method was employed, the number of macroblocks finally determined using intra mode per frame was considerably reduced. Thus, it can be seen that when intra prediction is skipped, the efficiency of the compression system is improved.

This effect of the present invention also has positive influence on storage media and space. In addition, the present invention can be used to improve the bandwidth of a video on demand (VOD) or image communication system.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for encoding a moving picture, comprising the steps of:
    setting a lowest one of rate-distortion (RD) costs of respective macroblocks adjacent to a macroblock to be encoded as a threshold value;
    setting a lowest one of mode-specific distortion costs obtained by inter prediction for the macroblock to be encoded as an optimum inter mode distortion cost;
    comparing the threshold value with the optimum inter mode distortion cost; and
    when the threshold value is larger than the optimum inter mode distortion cost, as a result of the comparison, skipping intra prediction and setting a mode having the optimum inter mode distortion cost as a final encoding mode.

2. The method of claim 1, wherein the adjacent macroblocks include macroblocks adjacent to left side, upper side, upper left vertex and upper right vertex of the macroblock to be encoded.

3. The method of claim 1, wherein the inter prediction is performed for 16×16 mode, 16×8 mode, 8×16 mode, 8×8 mode, 8×4 mode, 4×8 mode and 4×4 mode.

4. The method of claim 1, wherein luminance prediction is performed for 4×4 mode and 16×16 mode in the intra prediction.

5. The method of claim 4, wherein luminance prediction for 8×8 mode is further performed in the intra prediction.

6. A method for encoding a moving picture, comprising the steps of:
    setting a lowest one of RD costs of respective macroblocks adjacent to a macroblock to be encoded as a threshold value;
    setting a lowest one of mode-specific distortion costs obtained by inter prediction for the macroblock to be encoded as an optimum inter mode distortion cost;
    when the threshold value is larger than the optimum inter mode distortion cost, skipping intra prediction and setting a mode having the optimum inter mode distortion cost as a final encoding mode;
    when the threshold value is less than the optimum inter mode distortion cost, setting a lowest one of mode-specific RD costs obtained by intra prediction as an optimum intra mode RD cost; and
    comparing an optimum inter mode RD cost, which is the sum of the optimum inter mode distortion cost and a bit rate, with the optimum intra mode RD cost, and setting the mode having to the smaller of the two RD costs as a final encoding mode.

7. The method of claim 6, wherein the adjacent macroblocks include macroblocks adjacent to left side, upper side, upper left vertex and upper right vertex of the macroblock to be encoded.

8. The method of claim 6, wherein the inter prediction is performed for 16×16 mode, 16×8 mode, 8×16 mode, 8×8 mode, 8×4 mode, 4×8 mode and 4×4 mode.

9. The method of claim 6, wherein luminance prediction is performed for 4×4 mode and 16×16 mode in the intra prediction.

10. The method of claim 9, wherein luminance prediction is further performed for 8×8 mode in the intra prediction.

11. An apparatus for encoding a moving picture, comprising:
    an encoding unit that encodes a macroblock of a specific picture using encoding modes used in inter prediction and intra prediction;
    a transform/quantization unit that removes redundancy of image data and quantizing the image data;
    a variable length coding unit that changes a code word length according to a generation frequency of a specific symbol to compress data;
    an inverse transform/quantization unit that performs an inverse function of the transform/quantization unit;
    an RD cost calculation unit that calculates an RD cost on the basis of a rate value transferred from the variable length coding unit and a distortion value transferred from the inverse transform/quantization unit; and
    a mode selection unit that stores the calculation result of the RD cost calculation unit mode by mode, determines a mode having a lowest RD cost, transfers the determination result to the encoding unit, and sets a lowest one of RD costs of respective macroblocks adjacent to the macroblock to be encoded as a threshold value;
    wherein when a lowest one of mode-specific distortion costs obtained by inter prediction for the macroblock to be encoded is less than the threshold value, the mode selection unit skips intra prediction and sets an inter mode having the lowest distortion cost as a final encoding mode.

12. The apparatus of claim 11, wherein the adjacent macroblocks include macroblocks adjacent to left side, upper side, upper left vertex and upper right vertex of the macroblock to be encoded.

13. The apparatus of claim 11, wherein the encoding unit performs inter prediction for 16×16 mode, 16×8 mode, 8×16 mode, 8×8 mode, 8×4 mode, 4×8 mode and 4×4 mode.

14. The apparatus of claim 11, wherein the encoding unit performs luminance prediction for 4×4 mode and 16×16 mode in the inter prediction.

15. The apparatus of claim 11, wherein the encoding unit performs luminance prediction for 4×4 mode, 8×8 mode and 16×16 mode in the inter prediction.

16. A method for encoding a moving picture, comprising the steps of:
    setting a lowest one of rate-distortion (RD) costs of respective macroblocks adjacent to a macroblock to be encoded as a threshold value;

setting a lowest one of mode-specific distortion costs obtained by inter prediction for the macroblock to be encoded as an optimum inter mode distortion cost;

skipping intra prediction and setting a mode having the optimum inter mode distortion cost as a final encoding mode comparing the threshold value with the optimum inter mode distortion cost when the threshold value is larger than the optimum inter mode distortion cost, as a result of the comparison;

performing intra prediction when the optimum inter mode distortion cost is larger than the threshold value;

setting a lowest one of mode-specific RD costs obtained by the intra prediction for the macroblock to be encoded as an optimum intra mode RD cost;

adding a bit rate to the optimum inter mode distortion cost to calculate an optimum inter mode RD cost;

comparing the optimum inter mode RD cost with the optimum intra mode RD cost; and setting the mode corresponding to the smaller of the two RD costs as a final encoding mode.

\* \* \* \* \*